UNITED STATES PATENT OFFICE.

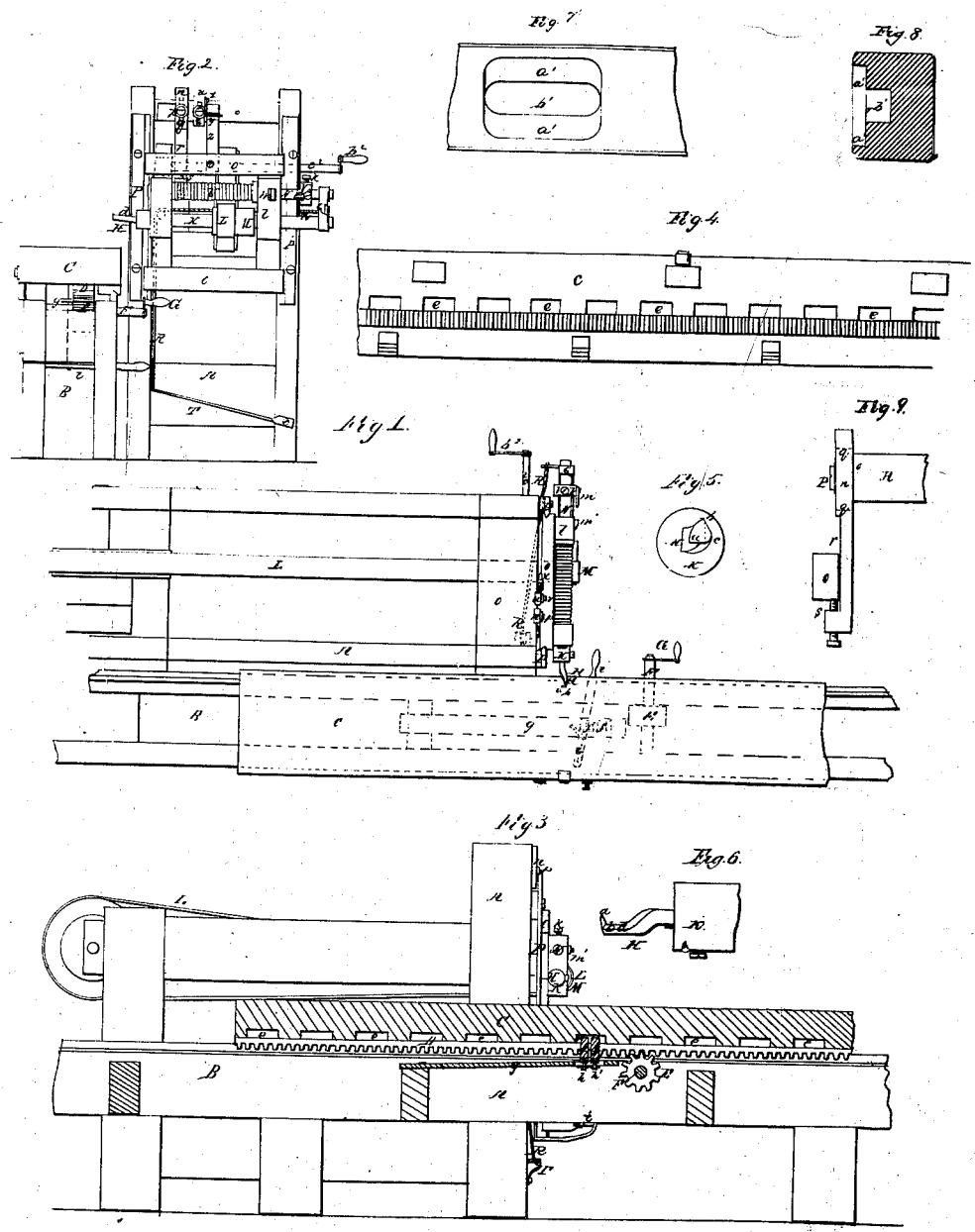

HENRY ALLEN, OF NORWICH, CONNECTICUT.

BORING AND MORTISING MACHINE.

Specification of Letters Patent No. 10,768, dated April 11, 1854.

*To all whom it may concern:*

Be it known that I, HENRY ALLEN, of Norwich, in the county of New London and State of Connecticut, have invented an Improved Machine for Boring and Mortising Bedstead-Posts or Various other Articles; and I do hereby declare that the same is fully described and represented in the following specification and the accompanying drawings, letters, figures, and references thereof.

Of the drawings, Figure 1 denotes a top view of my said machine. Fig. 2 is an end elevation of it, and Fig. 3 is a vertical central and longitudinal section of it taken through the feeding carriage.

In the said drawings, A exhibits the main frame for supporting the operative parts of the machine, such frame being constructed in any suitable manner. By the side of it is a frame B of ways, which sustains a feeding carriage C, an underside view of which is given in Fig. 4. The movement of the carriage on its supporting frame or ways is effected by means of a cogged rack D (attached to the carriage) and a toothed pinion E fixed on a shaft F arranged as seen in Figs. 1 and 3, there being a crank G on the outer end of the said shaft.

H, denotes the boring tool, it being made of a peculiar shape as seen in end view in Fig. 5, and in side view in Fig. 6. The cutting end of it is a sector of a circle, the arc, $a$, of which is ground down to a cutting edge, the part, $a$, of the arc being arranged in the axis of rotation of the tool, otherwise the tool will not enter the wood, and bore a complete cylindrical hole, whose radius is equal to the distance $a\ c$. The tool is also provided with a cutting edge $d$ made to stand perpendicularly or thereabouts to the end part $a\ b\ c$. Now the operation of sharpening this tool reduces it in such a manner as to cause it to proportionably diminish the diameter of its bore, and under such circumstances, the principal object of my improvement, therefore is to enable the tool to operate with the correctness required and also to obtain a tool which would answer the purpose I had in view. The work to be bored or mortised is firmly fastened down upon the feeding carriage, C, and such feeding carriage is provided with a series of rectangular or elongated recesses $e, e, e$, &c., as seen in Figs. 3 and 4. In connection with this series of recesses, I employ two stops or short posts $f, f'$, so applied to a spring $g$ as to be capable of being adjusted by screws $h\ h'$ nearer to or farther from each other and in such manner as to enable a person to place them in the proper positions on the spring as the wear of the boring tool may render necessary, in order to enable such tool to cut the length of mortise required (such length being governed by the length of a recess $e$ and the two stops $f\ f'$) when the latter is projected within it. The object of having a series of recesses is to enable a person to make two or more mortises in the work without removal of it from the bench. In boring an elongated mortise, the work is moved with a reciprocating rectilinear motion against the tool and while it is in revolution.

The spring $g$ may be depressed by means of a lever $i$ made to work through a cam groove, the object of such depression of it being to throw the stops $f\ f'$ out of any recess $e$ previous to any very extended movement of the feeding carriage on its rails.

A mandrel K supports the boring tool and is put in rotation by means of an endless belt L that is made to work around a pulley M fixed on the mandrel. The said mandrel and a slide shaft N are sustained by a movable frame O that is made to play vertically between parallel guides P P'.

A cross bar Q conects the mandrel and the slide shaft together, and has a cord R attached to it and made to run horizontally and to pass over a guide pulley and thence downward to a treadle or foot lever T, the whole being so that when a person bears his foot on the lever T he can create such an endwise movement of the mandrel K as to cause it to advance toward the work. A spring U applied around the slide shaft serves to produce a movement of the mandrel in an opposite direction, whenever the attendant moves his foot from the treadle.

Upon the slide shaft there is an adjustable shoulder piece V which is so applied to the shaft, as to be capable not only of being moved longitudinally on it, but of being fastened in any convenient position on it, by means of a set screw $k$. When fixed on the slide shaft, such shoulder piece serves as a stop to arrest the forward movement of the boring tool, and this it does when it is moved up against the box $l$. There is a small turning arm $m'$ applied to the side of the shoulder piece V and so as to be capable of being turned into a horizontal or vertical position. When in the former position, it projects beyond the side of the piece V (as seen in Fig. 2,) and when it abuts against a projection $m$ it serves to arrest the further longitudinal movement of the mandrel of the boring tool. By means of the double gage, composed of the slide V and the arm $m$, the depths of the bores to form a double mortise are regulated. Such double mortise being composed of the mortises $a'\ b'$, as seen in top view in Fig. 7 and in cross section in Fig. 8. It is employed in the posts of a bedstead and for the reception of the metallic tenon plate and tenon of the post.

In order to enable the tool to cut a tenon or recess of a width greater than the diameter of its circle of rotation, the said tool is applied to a movable frame O. Above this frame is a slide plate $n$ which is confined to the top rail $o$ of the frame by a set screw $p$ that extends through a long slot $q$ made through the slide. The slide is provided with a recess, $r$, (see Fig. 9, which is a side view of the slide) and an adjusting stop or screw $s$. The top rail of the frame O is made to enter the said recess so that when the frame is raised up high enough such top rail will abut against the top of the recess. Also, that when depressed far enough, said top rail will bring up against the stop screw $s$. There is also another slide $n$ fixed to the frame by means of a set screw $v$ that works through a slot $w$. A turning catch $x$ is applied to the side of the slide and when turned into a notch or recess $y$ formed in an arm $z$ projecting from the frame O it brings the frame up into such a position as will adjust the boring tool to the middle of any mortise formed by it.

The frame O may be raised by means of a rack and pinion, and power properly applied to such or to a crank $b^2$ affixed on the end of a shaft $c^2$ of such pinion.

A machine constructed in the manner as above described is particularly calculated and useful for the mortising of bed posts. In fact it is a most valuable labor saving machine for such purposes.

I claim—

1. In the combination with a boring tool of the above peculiar kind, or one in which the diameter of its bore diminishes in proportion to the wear or reduction of the tool by the process of sharpening it, I claim the two adjustable stops $f,\ f'$ or their equivalents applied to the frame or ways that support the feeding carriage and made to operate in any one of the mortise recesses $e,\ e$, &c., thereof, the said stops being not only for regulating the amount of movement of the feeding carriage required while a mortise is being made by the boring tool, but also to compensate for the wear of the tool as stated.

2. And I also claim the adjustable shifting catch $x$ in combination with the adjustable gage or slide plate $n$ provided with a recess $r$ and screw $s$ as specified, the same being particularly for the purpose of readily centralizing the boring tool as stated.

In testimony whereof I have hereto set my signature this eighteenth day of July, A. D. 1853.

HENRY ALLEN.

Witnesses:
R. H. EDDY,
B. F. DAM.